July 6, 1948.    F. K. SIGNAIGO    2,444,712
LIGHT POLARIZING POLYVINYL ORTHOBORATE FILMS
Filed July 6, 1945
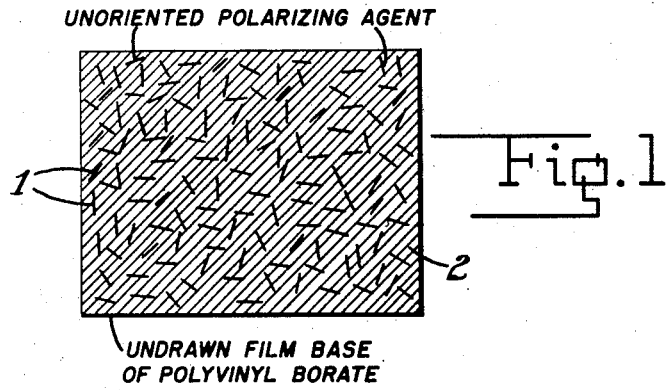
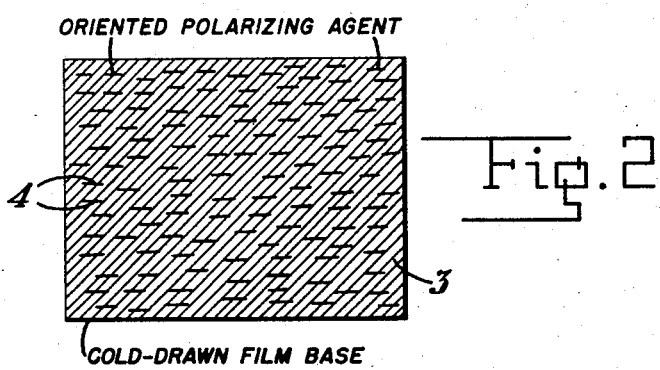
INVENTOR.
Frank Kerr Signaigo
BY
ATTORNEY

SEARCH ROOM

Patented July 6, 1948

2,444,712

UNITED STATES PATENT OFFICE 2,444,712

LIGHT POLARIZING POLYVINYL ORTHOBORATE FILMS

Frank Kerr Signaigo, Kenmore, N. Y., assignor to E. I. du Pont de Nemours & Company, Wilmington, Del., a corporation of Delaware Application July 6, 1945, Serial No. 603,583

7 Claims. (Cl. 88—65)

1

This invention relates to new doubly refracting and light-polarizing films and to the process for obtaining them.

Several polymeric materials in the form of transparent films have been employed for making light-polarizers. Among these polyvinyl alcohol is outstanding because it has high strength, can be highly oriented, readily absorbs many polarizing agents and produces highly efficient light-polarizing films. See U. S. 2,237,567. In spite of these desirable properties its use is handicapped by its great water sensitivity so that polarizing or other oriented sheets very rapidly lose their orientation and hence polarizing properties on exposure to water. To overcome this it has been proposed to protect polarizing films of polyvinyl alcohol by laminating these between sheets of glass or plastics. This method involving additional operations is costly. The water sensitivity of polyvinyl alcohol also makes it necessary to exercise critical control over the operations of orienting the films and absorbing thereon polarizing substances. The advantages and disadvantages of polyvinyl alcohol polarizing films apply likewise to oriented, doubly refracting but non-polarizing films of this polymeric material.

It is an object of the present invention to provide a new light-polarizing film which overcomes these disadvantages of polyvinyl alcohol film while retaining the desirable properties and these to an even greater degree. A further object is to provide a rapid and very simple process for obtaining doubly refracting or highly efficient light-polarizing films. A still further object is to provide new doubly refracting films or highly efficient light-polarizing films or sheets having water and solvent resistance, scratch resistance, stiffness and light and temperature stability suitable for optical uses without the need for protective and stiffening laminations or backing. Another object is to convert polyvinyl alcohol into films having the above described characteristics. Other objects will appear hereinafter.

These objects are accomplished by a sheet of polyvinyl borate, the molecules of which are substantially oriented in one direction in the plane of the sheet and which contains therein a molecularly dispersed dichroic substance. Molecularly oriented, doubly refracting sheets of polyvinyl borate containing no dichroic substance likewise form a part of this invention. The process for obtaining such doubly refracting or light-polarizing sheet which comprises soaking a sheet of a polyvinyl alcohol substance having an average of at least one hydroxyl group for every three carbon atoms in the main polymer chain in an aqueous solution of boric acid or a solution of boric acid and a polarizing stain or dye until the film is swollen, stretching said sheet while still swollen and drying the sheet while it is held in the stretched condition also forms a part of this invention. Alternatively the unstained oriented doubly refracting sheet of polyvinyl borate obtained by treatment of a stretched polyvinyl alcohol with a solution of boric acid only may be treated with a solution of a polarizing substance whereby the latter will be absorbed by the polyvinyl borate sheet to cause the sheet to become light-polarizing.

The invention is illustrated in more detail by the following examples which are not to be understood as limitative.

Example I

A solution is made by dissolving 5 parts of boric acid, 0.25 part of potassium iodide and 0.13 part of iodine in 95 parts of water. Completely hydrolyzed, unsoftened polyvinyl alcohol film 0.003" thick is immersed in the above solution until it is completely swollen. This takes about 10–15 minutes at room temperature. The film is then removed from the solution and stretched to about five times its original length or substantially to the limit of its elastic stretch. The sheet is then held in the extended condition in a current of warm air until dry. The drying proceeds much more rapidly than the drying of a polyvinyl alcohol sheet which has been wet with water alone.

This product consists of an oriented film of polyvinyl borate containing also the polarizing polyiodide stain i. e., a sorption complex of the stain on molecularly oriented polyvinyl borate. It contains approximately 5% of boron by weight, a majority of the hydroxyl groups of the original polyvinyl alcohol having been esterified with boric acid. The film is highly efficient as a light polarizer transmitting over 40% of white light in a highly plane polarized beam and transmitting almost completely, incident light that is polarized in a plane that is perpendicular to the direction of stretching. Two such films superimposed so that their directions of stretching are at right angles, are completely opaque to white light and to its components such as red, green, and blue light. Polarizing polyvinyl borate film as described above polarizes the components of white light with almost equal efficiency so that objects viewed through such a film appear in their natural color.

Figure 1 is a diagrammatic view of an undrawn and unoriented polyvinyl borate film 2, containing the molecules of the polymer and the dichroic stain 1, arranged in random fashion throughout the film.

Figure 2 is a similar view of a polyvinyl borate film 3, containing molecules of dichroic stain 4, in which the polymer molecules have been arranged in a parallel manner by the drawing treatment, and in which the molecules of dichroic stain form a complex with the oriented polymer molecules and are also arranged in parallel manner.

Unlike oriented polyvinyl alcohol or polarizing films made from it, the polyvinyl borate resists any change on soaking in cold water for a few hours. Consequently, such films may be repeatedly cleaned as by wiping with wet cloths and can be used in humid atmospheres. Polyvinyl borate is much harder than polyvinyl alcohol and its films are highly scratch resistant. Because of its increased stiffness with respect to polyvinyl alcohol, relatively thin films of polyvinyl borate can be used in optical systems without requiring a stiff backing. Polarizers of polyvinyl borate can be heated to at least 100° C. for several hours without change and show no deterioration on exposure in a "Fade-ometer" for over 100 hours to ultraviolet light.

*Example II*

Polyvinyl alcohol film 0.005" thick is swollen by immersing it for 5 mins. in an aqueous solution containing 5% of boric acid at 90° C. The film is then stretched to near its elastic limit and dried in the extended state as in the preceding example. The film is completely colorless and transparent. It has a birefringence of greater than 0.02. Oriented polyvinyl borate is exceedingly strong in the direction of stretching, and tensile strengths up to 50,000 lbs. per sq. inch are readily obtained. This product may be used as such in optical systems or for other purposes. It may also be converted to a light-polarizing film by treating it with an aqueous solution of a polarizing substance as for example a 5% solution of potassium polyiodide. The film need not be held in the extended state since it rapidly absorbs the stain without losing its orientation.

*Example III*

Light-polarizing films of oriented polyvinyl borate are prepared as described under Example I except that the boric acid treating solution also contains dissolved in it a polarizing dye. Thus a blue dye (Colour Index No. 406) yields a film that polarizes green and red light and a brown dye of the formula.

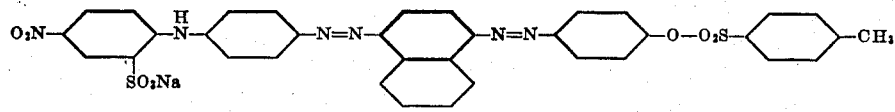

produces a highly efficient polarizer for blue light.

The above examples illustrate the preparation of doubly refracting or light-polarizing films of oriented polyvinyl borate. The polyvinyl borate of this invention is an ester of a polyvinyl alcohol substance with boric acid and contains at least 4% of boron. The preferred starting material for preparing these films is completely hydrolyzed polyvinyl alcohol film. Good results are obtained also from polyvinyl alcohols having a minor proportion of substituent groups such as acetal or ester groups. Preferably the polyvinyl alcohol should have an average of at least one hydroxyl group for every three carbon atoms in the main polymer chain. Hydrolyzed interpolymers of ethylene and polyvinyl acetate containing up to about 10% of ethylene may also be used with good results as this material also has a very high proportion of free hydroxyl groups.

For converting polyvinyl alcohol to polyvinyl borate it is preferred to immerse the film in an aqueous solution containing from 3.5 to 6% by weight of boric acid so that the resulting polyvinyl borate will contain at least 4% of boron. The use of weaker solutions which lead to a lower degree of substitution gives products of less desirable properties such as decreased water resistance. If the boric acid solution contains more than about 10 to 15% of the acid which is possible by using hot solutions, more boric acid is introduced into the film than can react with the hydroxyl groups of the polyvinyl alcohol and this excess will crystallize out giving a cloudy or opaque film. Polyvinyl alcohol may be soaked indefinitely in aqueous boric acid solutions either hot or cold without losing its strength or becoming sticky. Hence the films are easily handled even in the wet, swollen condition. As indicated in the examples the reaction is accomplished readily at room temperature but the rate of swelling of the film can be increased by using temperatures up to 100° C. if desired.

When light-polarizing films are desired, the optimum concentration of the polarizing agent is readily determined by experiment. This will depend somewhat on the film thickness, the time and temperature of treatment, the degree of orientation, the polarizing efficiency desired and the particular polarizing material used. The conversion of polyvinyl borate to a light-polarizing material is however not very critical in this respect. For general use, light polarizers made with the polarizing polyiodide stains are preferred. If the polyiodide is to be applied from the boric acid solution as in Example I, a low concentration is desirable, that is a boric acid solution containing from about 0.02% to about 1% by weight of polyiodide. When oriented, dried polyvinyl borate film is to be stained, the staining solution will preferably contain from about 0.1% to 10% of polyiodide. The ratio of iodine to iodide used to make up the polyiodide stain can be varied considerably depending upon the effects desired and sodium and ammonium polyiodides as well as potassium polyiodide i. e., water soluble polyiodides of monovalent cations give good results. Polarizing dyestuffs and other dichroic materials such as certain colloidal metals may be used instead of polyiodides for making light polarizers with oriented polyvinyl borate film.

The optimum degree of stretching of the swollen film will depend somewhat on the desired efficiency of the light polarizer. For most purposes it is preferred to stretch the film from 2 to the elastic limit which in some cases may be as much as 7 times the original length. The stretched film dries rapidly at room temperature but this can be accelerated by employing warm air and if the film is subsequently to be exposed to elevated temperatures it is preferable to set the orientation by drying the film at a temperature equal to or above the temperature to which the film will later be subjected.

Because of the nature of the steps in this process it is admirably adapted to being carried out in a continuous manner. For example the polyvinyl alcohol film may be led consecutively through the boric acid swelling bath, between stretching rollers and through a drying chamber. A very short processing time can be achieved.

The light-polarizing films of this invention may be used in numerous optical systems where polarization of light is desired. Among these may be mentioned sun glasses and viewers for and components of three-dimensional pictures. The non-polarizing birefringent polyvinyl borate film may likewise be used for optical purposes but also should find other applications where a strong, colorless, solvent resistant, oriented film is desired.

It is to be understood that the invention is not limited to the exact details shown and described for obvious modifications will occur to a person skilled in the art.

What is claimed is:

1. A light polarizer consisting of a sorption complex of a dichroic stain on molecularly oriented solid polyvinyl orthoborate, said polyvinyl orthoborate containing at least 4% boron.

2. A light polarizer comprising a substantially uniaxial sheet of a polyvinyl alcohol borate having its optical axis in the plane of the sheet and having incorporated therein a substantially oriented dichroic sorption complex of a stain on a polyvinyl alcohol orthoborate, said polyvinyl orthoborate containing at least 4% boron, said complex being a substantial absorber for light vibrating parallel to its axis and substantially a non-absorber for light vibrating perpendicularly to its axis.

3. A light polarizer of a sorption complex of a dichroic stain on a molecularly oriented solid orthoborate of a polyvinyl alcohol, said alcohol having an average of one hydroxyl group per 2 to 3 carbons of the polymer chain and said orthoborate containing at least 4% boron.

4. A light-polarizing, molecularly oriented film of a polyvinyl orthoborate of at least 4% boron comprising a dichroic stain.

5. A light-polarizing, molecularly oriented film of a polyvinyl orthoborate of at least 4% boron, and further comprising a dichroic stain of a water-soluble polyiodide of a monovalent cation.

6. A birefringent, molecularly oriented film of a polyvinyl orthoborate of at least 4% boron content.

7. A light-polarizing, molecularly oriented film of a polyvinyl orthoborate of at least 4% boron content and a dichroic substance.

FRANK KERR SIGNAIGO.

REFERENCES CITED

The following references are of record in the file of this patent:

UNITED STATES PATENTS

| Number | Name | Date |
|---|---|---|
| 2,072,302 | Herrmann | Mar. 2, 1937 |
| 2,072,303 | Herrmann | Mar. 2, 1937 |
| 2,146,295 | Herrmann | Feb. 7, 1939 |
| 2,237,567 | Land | Apr. 8, 1941 |
| 2,255,940 | Rogers | Sept. 16, 1941 |
| 2,270,323 | Land et al. | Jan. 20, 1942 |
| 2,300,074 | Strain | Oct. 27, 1942 |
| 2,310,223 | Eaton et al. | Feb. 9, 1943 |
| 2,326,539 | Irany | Aug. 10, 1943 |
| 2,327,872 | Dahle | Aug. 24, 1943 |
| 2,328,219 | Land | Aug. 31, 1943 |

OTHER REFERENCES

Jones article in (Br.) Plastics, February, 1944 (polyvinyl alcohol) pages 79, 80.